2,943,988
HALOGENATION OF RUBBERY POLYMERS

Peter J. Canterino, Bartlesville, Okla., assignor to Phillips Petroleum Company, a corporation of Delaware No Drawing. Filed May 17, 1956, Ser. No. 585,400

6 Claims. (Cl. 204—163)

This invention relates to a process of halogenating synthetic polymers and to the products obtained therefrom. In one of its aspects, this invention relates to a process of halogenating a blend of rubbery and liquid synthetic polymers. In another of its aspects, it relates to the production of thermoplastic, halogenated polymers.

The chlorination of rubber has been the subject of extensive investigation. Addition of chlorine to the double bonds present in rubber takes place easily, as it does with ordinary olefins. However, the chlorination of rubber is more complex in that several side reactions take place. The most likely side reactions are cyclization and crosslinking. In chlorinating natural rubber, the chief side reaction is cyclization. As chlorination progresses the natural rubber cyclizes but does not bring about crosslinking. At a chlorine content of about 50 percent, the rubber precipitates out of carbon tetrachloride. On further chlorination, it once again dissolves in the carbon tetrachloride solution. In order to continue the chlorination after all the double bonds are saturated, various auxiliary chlorination promoters have been used. There are numerous references in the literature to such chlorination promoters such as organic peroxides, ultraviolet radiation, iodine, stannic chloride, and antimony oxychloride for obtaining more rapid chlorination and higher chlorine content in the rubber after saturation of the double bonds.

When synthetic polymers became available, attempts were made to chlorinate these, using the same procedure which had been employed to chlorinate natural rubber. It was found that an unsatisfactory product resulted. The product would gel and precipitate out of the carbon tetrachloride solution, and (unlike natural rubber) on further chlorination would fail to redissolve. It was found that the precipitated polymer was crosslinked through some side reaction which gelled the polymer rendering it insoluble in organic solvents. Such a product was worthless for many uses.

A process has now been found whereby a rubbery conjugated diene polymer can be readily chlorinated, in the presence of a suitable solvent to give soluble products containing up to 75 weight percent chlorine and higher. The process comprises blending with the rubbery polymer at least 5 parts and upward to 90 parts by weight per 100 parts total polymeric material of a liquid conjugated diene polymer and reacting the blend, in solution, in a solvent such as carbon tetrachloride, with elemental chlorine. The products resulting from such a process are thermoplastic materials which are soluble in organic solvents such as acetone, benzene, toluene, and carbon tetrachloride.

Accordingly, one or more of the following objects are obtained by the practice of my invention.

One object of the present invention is to provide a novel process for halogenating a blend of synthetic rubbery and liquid dienic polymers.

Another object of this invention is to provide a novel process for chlorinating a blend of synthetic rubbery and liquid dienic polymers dissolved in a suitable organic solvent.

A further object is to provide a novel process for controlling the viscosity of a chlorinated polymer produced by varying the ratio of the liquid and rubbery polymer reactants.

Another object of my invention is to produce chlorinated synthetic polymers which are compatible as an ingredients for paints, lacquers, and the like, as well as for the fabrication of molded articles.

A further object of this invention is to produce novel chlorinated synthetic polymers which are thermoplastic and soluble in acetone, carbon tetrachloride, benzene, toluene, and the like.

When operating in accordance with the process of this invention, the rubbery and liquid polymers may be blended and the blend dissolved in the solvent or the rubber may be dissolved and the liquid polymer added to the soltuion. Addition of the chlorine can be effected by passing the gas into the reaction mixture with agitation to provide complete contacting, or chlorine can be dissolved in a solvent, such as that used to dissolve the polymer, and added to the reaction mixture. An alternative procedure comprises adding a portion of the chlorine as a solution in a suitable solvent and introducing the remainder in the gaseous form or vice versa. When chlorination has proceeded to the point of saturation of the double bonds in the polymer, the reaction becomes one of substitution rather than addition and the substitution reaction is slower. It is convenient to irradiate the mixture with ultraviolet light or otherwise promote the chlorination reaction by iodine, benzoyl peroxide, stannic chloride, antimony oxychloride or other prior art methods to effect the substitution reaction if it is desired to produce a material having a relatively high chlorine content.

The solvent preferred in this process is carbon tetrachloride although other solvents which are applicable include chloroform, ethylene dichloride, tetrachloroethane, chlorobenzene, benzene, and others. Solvents such as chlorobenzene and benzene, as well as any other solvents which will undergo reaction with chlorine, may be used when a product having a relatively low chlorine content is prepared but they are not preferred when it is desired to prepared materials having a high chlorine content.

The amount of solvent employed is generally that which will give a solution containing between 5 and 30 weight percent of polymer. The solvent should be used in such quantity that the reaction mixture can be easily stirred and contact of the reactants facilitated. While very viscous mixtures can be chlorinated, the process is somewhat more difficult than when the mixture can be readily stirred.

Reaction temperatures will generally be in the range from about 5° to about 80° C., preferably from 20° to about 80° C. The chlorination reaction is exothermic and the reaction mixture is maintained within the desired temperature range by suitable cooling means. Atmospheric pressure operation is satisfactory but elevated pressure can be employed if desired. When conducting the reaction at a temperature at or near the atmospheric boiling point of the solvent employed, it is desirable to employ superatmospheric pressure or a suitable reflux means to prevent loss of solvent.

The chlorinated product can be easily separated from the reaction mixture in one of several ways. One method comprises pouring the solution into hot water in sufficient quantity and at a high enough temperature to evaporate the solvent. The product is brought to the surface where it can be separated from the water. Instead of adding the reaction mixture to hot water, it can be continuously applied in a thin stream to heated rollers. The solvent is evaporated and the solid product obtained. Another method consists of pouring the reaction mixture into an alcohol, e.g., methanol, ethanol, or isopropanol. This treatment coagulates the product which is separated, washed, and dried.

The liquid and rubbery polymers which are applicable in this invention are homopolymers of aliphatic conjugated dienes and copolymers of conjugated dienes with styrene, alpha-methylstyrene, alkyl such as methyl, ethyl, and propyl, alkoxy such as methoxy, ethoxy, and propoxy, and halogen-substituted styrenes, and esters of acrylic and methacrylic acids such as methylacrylate, ethylacrylate, methyl methacrylate, ethyl methacrylate, and the like. The aliphatic conjugated dienes which are applicable are preferably those which contain from 4 to 12 carbon atoms per molecule and include 1,3-butadiene, isoprene, piperylene, 2-methylpentadiene, 2,3-dimethyl-1,3-butadiene, chloroprene, and others. Generally at least 50 percent by weight of conjugated diene is used in the preparation of the copolymers.

Both liquid and solid polymers may be prepared by any known methods, i.e., by mass or emulsion polymerization. Procedures which will yield both liquid and rubbery polymers are well known in the art. The preferred blend of polymers, i.e., rubbery and liquid polymers, is a mixture of liquid polymer prepared by mass polymerization and rubbery polymer prepared by an emulsion polymerization.

When preparing the soluble chlorinated polymers, the amount of rubbery polymer used as the starting material should generally not exceed 95 parts by weight per 100 parts total polymeric material, and as low as 10 parts of rubber polymer per 100 parts total polymeric material may be employed. In general, however, the particular ratios of the rubbery polymer and liquid polymer will be determined, at least in part, by the Mooney value of the rubbery polymer and the viscosity of the chlorination product desired.

The viscosity of the liquid polymer is in the range of 100 to 10,000, preferably 200 to 5000 Saybolt Furol Seconds at 100° F. The Mooney (ML–4) of the rubbery polymer is in the range of 5–125, preferably 5–75.

The halogenation reaction can be effected with elemental chlorine or compounds capable of yielding elemental chlorine in situ under the particular reaction conditions employed. Other halogenation agents are elemental iodine and bromine or compounds capable of releasing the elemental halogen under the reaction conditions.

The products of this invention are thermoplastic materials which are soluble in such solvents as benzene, toluence, acetone, carbon tetrachloride and others. These polymers are compatible with alkyd and phenolic resins and can be compounded therewith for use in coating compositions. The chlorinated polymers are valuable as constituents of coating compositions which can be applied to metal, wood, etc., to protect against weathering, insects, and rusting. The chlorinated polymers are also useful in adhesives, cements, etc.

Compositions of low chlorine content are more rubbery while those of high chlorine content are harder, less flexible and more resinous. Compositions having a low chlorine content, i.e., from 7 to 30 weight percent chlorine, can be sulfur-vulcanized to give products having good tensile strength. They are useful in wire coating, textile coating, molded products, cements, etc. Compositions containing from 30 to 50 weight percent chlorine are harder and are useful in tubing and for the manufacture of molded products. Compositions having a higher chlorine content are suitable for making molded disks, knobs, handles, etc. They are also useful in paints as they are soluble in the material employed as the thinner.

Reaction time depends on whether one is chlorinating unsaturated linkages or substituting chlorine for hydrogen. In the former case the reaction time is normally determined by the time required for the addition of the chlorine to the reaction mixture since on contact with elemental chlorine the chlorination of unsaturated linkages is substantially instantaneous. However, when the chlorination has proceeded to the point of saturation of these linkages the reaction then becomes one of substitution which is considerably slower than addition. In fact, at this point, it is often desirable to employ ultra-violet light, iodine, antimony oxychloride, stannic chloride, benzoyl peroxide, or other well-known chlorination promoters to expedite the substitution reaction. By this method, products containing 75 weight percent, and higher, chlorine can be prepared. The chlorination time will vary depending on the particular polymers being chlorinated, the viscosity, and the amount of chlorine desired to be introduced into the polymeric material. In general, a period of 15 minutes to 24 hours will effect the degree of chlorination desired.

By the term "auxiliary chlorination promoter" I mean a promoter which will particularly facilitate the substitution reaction of the polymers in question once the unsaturated linkages are chlorinated. The auxiliary chlorination promoters which are applicable include ultraviolet light, iodine, organic peroxides such as benzoyl peroxide, stannic chloride, antimony oxychloride, and others well-known in the art.

By the terms "liquid polymer" and "rubbery polymer" I mean homopolymers of an aliphatic conjugated diene and copolymers of an aliphatic conjugated diene and a compound polymerizable therewith which contains a $CH_2=C<$ group.

EXAMPLE I

The following recipe was employed to prepare a polybutadiene rubber, Money value (ML–4) of 42, by emulsion polymerization at 41° F.

| | Parts by weight |
|---|---|
| Butadiene | 100 |
| Water | 180 |
| Dresinate 214 [1] | 4.5 |
| Potassium chloride | 0.5 |
| Potassium hydroxide | 0.03 |
| Ferrous sulfate heptahydrate | 0.02 |
| Versene [2] | 0.04 |
| Sodium formaldehyde sulfoxylate | 0.1 |
| Diisopropylbenzene hydroperoxide | 0.1 |
| Tertiary dodecyl mercaptan | 0.85 |

[1] Rosin soap, potassium salt.
[2] Tetra sodium salt of ethylenediamine tetraacetic acid.

A 60 percent conversion was reached in 7.8 hours. The reaction was shortstopped with di-tert-butylhydroquinone using 8 grams per 6 lbs. of polymer and 1 part per 100 parts of rubber of Polygrad [1] was added as the antioxidant.

The 42 ML–4 polybutadiene rubber was dissolved in carbon tetrachloride and liquid polybutadiene was added. The liquid polybutadiene was prepared by mass polymerization using finely divided sodium as the catalyst and n-heptane as the solvent. The n-heptane-butadiene weight ratio was 1.5 to 1.0. The sodium-butadiene weight ratio was 0.015 to 1.0. The temperature was maintained in the range between about 190° to 210° F., and the pressure employed was sufficient to maintain a liquid phase reaction mixture, i.e., about 7 to about 18 p.s.i.g. The liquid polybutadiene had a viscosity of approximately 1500 Saybolt Furol Seconds at 100° F., a Gardner color of 11, a refractory index $n_D^{20}$ equal to 1.5198, specific gravity, 60° F. of 0.9083, and an API gravity, 60° F.

[1] Tris-nonylphenyl sulfite.

equal to 24.3. Several blends were prepared using variable proportions of the liquid and rubbery polybutadiene. The total polymer present (liquid and rubber) in each run was 200 grams except for one run in which 400 grams was used. Each of the several blends was chlorinated in carbon tetrachloride solution as was a solution of 200 grams of the liquid polybutadiene dissolved in carbon tetrachloride (no rubber present). The general procedure was as follows: The polymer solution was stirred and introduction of chlorine was started at room temperature (approximately 75° F.). The temperature increased to reflux temperature after 200 grams of chlorine had been added. An ultraviolet lamp was turned on to irradiate the mixture while the remainder of the chlorine was introduced. No insoluble gel formed in any of the runs during chlorination. The chlorinated material was poured into isopropyl alcohol to coagulate the polymer which was filtered, washed with isopropyl alcohol, and dried overnight in a vacuum oven at 50° C. (122° F.). The following table shows the amounts of the various materials reacted in the several runs, the chlorine content of the products, and the viscosity of a 20 weight percent toluene solution of each product. The viscosity was measured on a Gardner Bubble Viscometer. A range is given in some cases which indicates that the actual viscosity value is between two of the standards given for the viscometer. The chlorinated products are soluble in benzene, acetone, toluene and carbon tetrachloride.

*Table I*

| Run No. | 42 ML-4 Polybutadiene, Grams | Liquid Polybutadiene, Grams | CCl$_4$, cc. | Cl$_2$, Grams | Chlorine in Product, Wt. Percent | Viscosity of 20% Toluene Solution, Centipoises |
|---|---|---|---|---|---|---|
| 1 | | 200 | 1,300 | 600 | 68.9 | 0.5 |
| 2 | 25 | 375 | 3,000 | 1,200 | 60 | 0.5–6 |
| 3 | 25 | 175 | 3,000 | 600 | 62.5 | 14 |
| 4 | 35 | 165 | 3,500 | 700 | 64.9 | 14–22 |
| 5 | 40 | 160 | 3,500 | 700 | 65 | 50–65 |
| 6 | 50 | 150 | 3,500 | 600 | 65 | 75 |
| 7 | 100 | 100 | 3,500 | 600 | 65.6 | 700 |
| 8 | 150 | 50 | 3,500 | 600 | 65 | 6,300–9,800 |

It is apparent from Table I that any desired viscosity may be achieved by choosing the appropriate ratio of rubbery to liquid polymer.

EXAMPLE II

An attempt was made to chlorinate a sample of the 42 ML-4 polybutadiene rubber employed in Example I in the absence of liquid polybutadiene. Forty grams of the polybutadiene rubber was dissolved in 3,500 cc. of carbon tetrachloride and 40 grams of chlorine was introduced while the mixture was stirred. Addition of chlorine was started at room temperature as in the preceding runs. The reaction mixture was subjected to irradiation by an ultraviolet lamp and stirred while 80 more grams of chlorine was introduced. During chlorination, grains of a gel-like precipitate formed which remained insoluble as chlorination was continued. The mixture was poured into isopropyl alcohol, filtered, washed with isopropyl alcohol, and dried overnight in a vacuum oven at 50° C. The product contained 62 weight percent chlorine. Besides being insoluble in carbon tetrachloride, it was also insoluble in acetone and toluene.

EXAMPLE III

The following Table II discloses runs employing 42 ML-4 polybutadiene rubber alone and 42 ML-4 polybutadiene rubber blended with liquid polybutadiene described in Example I. The polymeric material was dissolved in carbon tetrachloride and the temperature of the reaction mixed rose to 70° C. from the heat resulting from the chlorination reaction.

*Table II*

| Run No. | Parts 42 ML-4 Polybutadiene | Parts Liquid Polybutadiene | Parts CCl$_4$ in ml. | Percent Cl | Solubility of Product Acetone | Solubility of Product Benzene |
|---|---|---|---|---|---|---|
| 1 | 100 | 0 | 25,000 | | insoluble | insoluble |
| 2 | 50 | 50 | 1,766 | 54.5 | soluble | soluble |
| 3 | 33 | 67 | 1,766 | 54.7 | soluble | soluble |

It is readily apparent from Examples II and III that the chlorination of polybutadiene rubber results in crosslinked products which are insoluble in acetone and benzene. In Table I, a tremendous quantity of solvent was employed, yet the chlorinated rubber did not dissolve in the solvents employed. On the other hand, the 50/50 and 33/67 rubber/liquid polymer gave soluble chlorinated products.

EXAMPLE IV

A sample of the 42 ML-4 polybutadiene rubber noted above was chlorinated in the presence of phosphorus trichloride in the following manner. 150 grams of the 42 ML-4 polybutadiene rubber was dissolved in 3500 cc. of carbon tetrachloride and 50 grams of phosphorus trichloride was added. Chlorine was introduced while the mixture was stirred and after 200 grams of chlorine had been added, the mixture was irradiated with ultraviolet light and the addition of chlorine was continued until an additional 340 grams of chlorine had been consumed. The material was poured into isopropyl alcohol to coagulate the product which was filtered, washed, and dried in a vacuum oven at 50° C. The product had a chlorine content of 65 weight percent. The viscosity of a 20 percent toluene solution had a viscosity of 17.60 centipoises, measured on a Gardner Bubble Viscometer.

Two blends, termed blend A and blend B for convenience, of the above chlorinated rubber (viscosity 17.60 centipoises) with chlorinated liquid polybutadiene (viscosity 0.5 centipoise) described in run No. 1 of Example I were prepared and the viscosity of a 20 percent toluene solution of each blend was measured on a Gardner Bubble Viscometer. The amounts and viscosity of the materials employed and the viscosity of blend A and blend B are shown in the following table.

| | Grams | Viscosity (Centipoises) | Grams | Viscosity (Centipoises) |
|---|---|---|---|---|
| 65% Chlorinated polybutadiene (42 ML-4) | 5 | 1,760 | 10 | 1,760 |
| 68.9% Chlorinated liquid polybutadiene | 15 | 0.5 | 10 | 0.5 |
| Total (Grams) | 20 Blend A | 6–14 | 20 Blend B | 65–85 |

Differences between the products prepared by chlorinating the polymers separately and blending these resulting chlorinated polymers, and products prepared by first blending the liquid and rubbery polymers and then subjecting the latter blend to chlorination is shown by reference to the viscosities of the chlorinated products obtained in runs 6 and 7 of Example I. The liquid and rubbery products blended before chlorination have a higher viscosity than those which were chlorinated first and subsequently blended. This is, indeed, a surprising result and indicates that the molecular structure of the chlorinated products produced by both methods are different. Consequently, artisans skilled in the art can, by the practice of my invention, produce chlorinated polymers of a predetermined viscosity.

EXAMPLE V

A blend of 150 grams of liquid polybutadiene and 150 grams of 42 ML-4 butadiene rubber, described in Example I, dissolved in 3500 cc. of carbon tetrachloride, was chlorinated by the addition of 330 grams of chlorine. When this amount of chlorine was added, a precipitate was observed. It was separated by pouring the mixture into isopropyl alcohol, filtering it, and drying it overnight in a vacuum oven at 45° C. It had a chlorine content of 54.5 weight percent. The chlorinated product was soluble in acetone and toluene.

EXAMPLE VI

71/29 butadiene/styrene rubber, a Government Synthetic Rubber designated as X-572 GR-S and made by the U.S. Rubber Company, was prepared from the following recipe:

| | Parts by weight |
|---|---|
| Butadiene | 71 |
| Styrene | 29 |
| Water | 200 |
| Dresinate 214 (100%)[1] | 4.0 |
| Potassium hydroxide [2] | 0.05 |
| Potassium pyrophosphate | 0.17 |
| Ferrous sulfate heptahydrate | 0.2 |
| Potassium sulfite | 0.08 |
| Trisodium phosphate | 0.30 |
| Cumene hydroperoxide (100%) | 0.12 |
| Triton R-100 [3] | 0.1 |
| Mercaptan blend [4] | 0.21 |

[1] Rosin soap, potassium salt
[2] To adjust soap pH to 10.8±0.3
[3] Neutral sodium salt of a condensed aryl sulfonic acid
[4] A blend of tertiary $C_{12}$, $C_{14}$, and $C_{16}$ mercaptans in a ratio of 3:1:1 parts by weight.

Polymerization was effected at 40–43° F. and was carried to 60% conversion. It was shortstopped with hydroquinone plus hydrogen peroxide and 1.25 parts BLE antioxidant was added. (BLE antioxidant is a high temperature reaction product of diphenylamine and acetone.) The product had a Mooney value (ML–4) of 50. The rubber was coagulated by the salt-alcohol method.

Thirty-five grams of the 71/29 butadiene/styrene rubber was dissolved in 3500 cc. of carbon tetrachloride and 165 grams of liquid polybutadiene, described in Example I, was added. The mixture was stirred and chlorine was introduced. A precipitate was formed after 230 grams had been added but dissolved when the mixture was irradiated with ultraviolet light and addition of chlorine was continued. Total amount of chlorine introduced was 650 grams. The mixture was poured into isopropyl alcohol to precipitate the chlorinated product which was filtered, washed, and dried at 60° C. for 16 hours. The product had a chlorine content of 62.2 weight percent. The viscosity of a 20 per cent toluene solution was 32–50 centipoises, measured on a Gardner Bubble Viscometer. The product is also soluble in acetone and benzene.

EXAMPLE VII

Liquid polybutadiene was prepared by emulsion polymerization at 41° F. in accordance with the following recipe:

| | Parts by weight |
|---|---|
| Water | 180 |
| Methanol rinse | 1.2 |
| Butadiene | 100 |
| Potassium fatty acid soap | 5 |
| KOH | 0.05 |
| KCl | 0.3 |
| Daxad 11 [1] | 0.1 |
| $K_4P_2O_7$ | 0.165 |
| $FeSO_4 \cdot 7H_2O$ | 0.139 |
| Oxidized Santomerse,[2] 0.52% active oxygen | 0.5 |
| tert-Dodecyl mercaptan | 5 |

[1] Sodium salt of condensed alkyl aryl sulfonic acid.
[2] Alkyl aryl sodium sulfonate.

A conversion of 69 percent was reached in 39.1 hours. Thirty-five grams of 42 ML–4 polybutadiene rubber, described in Example I, was dissolved in 3500 cc. of carbon tetrachloride and 165 grams of liquid polybutadiene, prepared as described above, was added. The mixture was stirred and chlorine was introduced. A precipitate formed after addition of 230 grams of chlorine but dissolved after irradiation with ultraviolet light, addition of a total of 700 grams of chlorine, and stirring for 60 hours. The product was precipitated by pouring the reactor contents into isopropyl alcohol, filtered, washed with isopropyl alcohol, and dried in a vacuum oven at 50° C. It had a chlorine content of 66.8 weight percent. The viscosity of a 20 percent toluene solution was 6–14 centipoises, measured on a Gardner Bubble Viscometer.

Reasonable variations and modifications can be made or carried out by those skilled in the art in the light of the above disclosure without departing from the spirit or scope of said disclosure.

I claim:

1. A process for halogenating a rubbery polymer to obtain a product which is soluble in acetone, in benzene, in toluene, and in carbon tetrachloride, said process comprising halogenating a mixture of from 95 to 10 parts by weight of a rubbery polymer selected from the group consisting of rubbery homopolymers and copolymers of aliphatic conjugated dienes having from 4 to 12 carbon atoms per molecule, and from 5 to 90 parts by weight of a liquid polymer selected from the group consisting of homopolymers and copolymers of aliphatic conjugated dienes having from 4 to 12 carbon atoms per molecule, said liquid polymer having a viscosity in the range 100 to 10,000 Saybolt Furol Seconds at 100° F., said polymers being in solution in a solvent selected from the group consisting of carbon tetrachloride, chloroform, ethylene dichloride, tetrachloroethane, chlorobenzene and benzene during halogenation, at a temperature in the range 5 to 80° C., and thus producing a halogenated rubbery polymer which is soluble as hereinbefore described.

2. A process for producing chlorinated rubbery polymers, which process comprises reacting elemental chlorine with a mixture of a rubbery polymer selected from the group consisting of rubbery homopolymers and copolymers of aliphatic conjugated dienes having from 4 to 12 carbon atoms per molecule and a liquid polymer selected from the group consisting of liquid homopolymers and copolymers of aliphatic conjugated dienes having from 4 to 12 carbon atoms per molecule, said liquid polymer having a viscosity in the range 200 to 5000 Saybolt Furol Seconds at 100° F., the weight ratio of said rubbery polymer to said liquid polymer being in the range 95:5 to 10:90, said mixture being maintained, during chlorination, in solution in a solvent selected from the group consisting of carbon tetrachloride, chloroform, ethylene dichloride, tetrachloroethane, chlorobenzene and benzene in a concentration in the range 5 to 30 weight percent, chlorination being conducted at a temperature in the range 20 to 80° C., and thus producing a chlorinated polymer which has a chemically combined chlorine content in the range 7 to 75 weight percent and is soluble in acetone, in benzene, in toluene, and in carbon tetrachloride.

3. A process for the production of a chlorinated polymer which is soluble in acetone, in benzene, in toluene, and in carbon tetrachloride, said process comprising reacting elemental chlorine with a mixture of a rubbery polymer of 1,3-butadiene having a Mooney viscosity (ML–4) in the range 5 to 125 and a liquid polybutadiene having a viscosity in the range 200 to 5000 Saybolt Furol Seconds at 100° F., the weight ratio of said rubbery polymer to said liquid polymer being in the range 95:5 to 10:90, said polymer being maintained, during chlorination, in solution in carbon tetrachloride in a concentration in the range 5 to 30 weight percent, the chlorination being effected at a temperature in the range 20 to 80° C., the reaction mixture being irradiated with ultraviolet light, continuing the chlorination to produce a chlorinated polymer having a chemically combined chlorine content in the range 50 to 75 weight percent, and recovering said chlorinated polymer.

4. A process for the production of a chlorinated rubbery polymer which is soluble in acetone, in benzene, in toluene, and in carbon tetrachloride, said process comprising reacting elemental chlorine with from 95 to 10 parts by weight of a rubbery polybutadiene having a Mooney viscosity (ML-4) in the range 5 to 75 in the presence of from 5 to 90 parts by weight of a liquid polybutadiene having a viscosity in the range 200 to 5000 Saybolt Furol Seconds at 100° F., said polymers being maintained, during chlorination, in solution in carbon tetrachloride at a total polymer concentration in the range 5 to 30 weight percent, the chlorination being effected in the range 20 to 80° C., the reaction mixture being irradiated with ultraviolet light, to produce a chlorinated polymer having a chemically combined chlorine content in the range 50 to 75 weight percent, and recovering said polymer.

5. A process for the production of a chlorinated rubbery polymer of butadiene which is soluble in acetone, in benzene, in toluene, and in carbon tetrachloride, said process comprising reacting elemental chlorine with a mixture of a rubbery polymer of butadiene selected from the group consisting of butadiene homopolymers and butadiene-styrene copolymers, said polymer having a Mooney viscosity (ML-4) in the range 5 to 75, and a liquid polybutadiene having a viscosity in the range 200 to 5000 Saybolt Furol Seconds at 100° F., said mixture being maintained, during chlorination, in solution in carbon tetrachloride at a total polymer concentration in the range 5 to 30 weight percent, the weight ratio of rubbery to liquid polymer being in the range from 1:15 to 3:1, the chlorination being effected at a temperature in the range 20 to 80° C., the reaction mixture being irradiated with ultraviolet light, to produce a chlorinated polymer having a chemically combined chlorine content in the range 50 to 75 weight percent, and recovering said polymer.

6. A product of a process according to claim 3.

References Cited in the file of this patent

UNITED STATES PATENTS

| | | |
|---|---|---|
| 1,695,636 | Ellis | Dec. 18, 1928 |
| 2,302,583 | Shutt | Nov. 17, 1942 |
| 2,393,509 | Archibald et al. | Jan. 22, 1946 |
| 2,426,512 | Large et al. | Aug. 26, 1947 |
| 2,537,627 | Weissert et al. | Jan. 9, 1951 |
| 2,537,630 | Reid | Jan. 9, 1951 |
| 2,638,460 | Crouch | May 12, 1953 |

FOREIGN PATENTS

| | | |
|---|---|---|
| 414,862 | Great Britain | Aug. 16, 1934 |

OTHER REFERENCES

Royals: "Advanced Organic Chemistry," page 420, copyright 1954 by Prentice-Hall, Inc., Englewood Cliffs, N.J.